(12) United States Patent
Aruga et al.

(10) Patent No.: US 12,479,148 B2
(45) Date of Patent: Nov. 25, 2025

(54) FILM AND METHOD OF PRODUCING THE SAME

(71) Applicant: AGC INC., Tokyo (JP)

(72) Inventors: Hiroshi Aruga, Chiyoda-ku (JP); Yoshiaki Higuchi, Chiyoda-ku (JP); Yuya Horiguchi, Chiyoda-ku (JP); Junetsu Nakamura, Chiyoda-ku (JP)

(73) Assignee: AGC INC., Tokyo (JP)

( * ) Notice: Subject to any disclaimer, the term of this patent is extended or adjusted under 35 U.S.C. 154(b) by 148 days.

(21) Appl. No.: 18/047,721

(22) Filed: Oct. 19, 2022

(65) Prior Publication Data

US 2023/0065010 A1 Mar. 2, 2023

Related U.S. Application Data

(63) Continuation of application No. PCT/JP2021/015893, filed on Apr. 19, 2021.

(30) Foreign Application Priority Data

Apr. 22, 2020 (JP) ................. 2020-076243

(51) Int. Cl.
*B29C 48/88* (2019.01)
*B29C 48/00* (2019.01)
(Continued)

(52) U.S. Cl.
CPC .......... *B29C 48/914* (2019.02); *B29C 48/022* (2019.02); *B29C 48/08* (2019.02); *B29C 48/911* (2019.02); *B29C 48/9135* (2019.02); *C08F 214/245* (2013.01); *C08J 5/18* (2013.01); *B29K 2023/08* (2013.01); *B29K 2027/18* (2013.01); *B29K 2105/0085* (2013.01); *B29K 2995/0026* (2013.01); *B29L 2007/008* (2013.01); *C08F 2800/10* (2013.01); *C08J 2327/18* (2013.01)

(58) Field of Classification Search
CPC ... B29C 48/08; B29C 48/911; B29C 48/9135; B29C 48/914; B29D 7/01; B29D 2007/00; B29D 2007/008; B29K 2023/08; B29K 2027/18; B29K 2105/0085
USPC ............................................ 264/211.12, 237
See application file for complete search history.

(56) References Cited

U.S. PATENT DOCUMENTS

2006/0205903 A1 9/2006 Aida et al.
2010/0188619 A1* 7/2010 Otoshi ............... B29C 48/08
349/96

(Continued)

FOREIGN PATENT DOCUMENTS

CN 107443701 A * 12/2017 ........... B29C 48/914
CN 108350197 A 7/2018
(Continued)

OTHER PUBLICATIONS

Translation of CN 107443701 A (published on Dec. 8, 2017).*
International Search Report issued Jun. 29, 2021 in PCT/JP2021/015893 filed Apr. 19, 2021, 3 pages.

*Primary Examiner* — Leo B Tentoni
(74) *Attorney, Agent, or Firm* — Oblon, McClelland, Maier & Neustadt, L.L.P.

(57) ABSTRACT

A film includes a copolymer having a tetrafluoroethylene-based unit and an ethylene-based unit, in which the film has a haze of from 1.2% to 8.0%, an ultraviolet reflectance of less than 17.0%, and a thickness of from 250 to 400 μm.

8 Claims, 2 Drawing Sheets

(51) Int. Cl.
*B29C 48/08*   (2019.01)
*C08F 214/24*  (2006.01)
*C08J 5/18*    (2006.01)
*B29D 7/01*    (2006.01)
*B29K 23/00*   (2006.01)
*B29K 27/18*   (2006.01)
*B29K 105/00*  (2006.01)
*B29L 7/00*    (2006.01)

(56) References Cited

U.S. PATENT DOCUMENTS

2011/0117348 A1* 5/2011 Takizawa ............... B29C 48/08
                                                      428/220
2013/0319510 A1* 12/2013 Bonnet ................ B29C 39/003
                                                      136/251
2015/0252156 A1  9/2015 Kouketsu et al.
2017/0136673 A1  5/2017 Aruga et al.
2018/0186914 A1  7/2018 Taguchi et al.

FOREIGN PATENT DOCUMENTS

| EP | 2 818 515 A1 | 12/2014 |
| JP | 6-263891 A | 9/1994 |
| JP | 10-287784 A | 10/1998 |
| JP | 467712 B2 | 4/2011 |
| WO | WO 2014/103845 A1 | 7/2014 |

* cited by examiner

FILM AND METHOD OF PRODUCING THE SAME

CROSS-REFERENCE TO RELATED APPLICATIONS

This application is a Continuation of International Application No. PCT/JP2021/015893, filed Apr. 19, 2021, which claims priority to Japanese Patent Application No. 2020-076243 filed Apr. 22, 2020. Each of the above applications is hereby expressly incorporated by reference, in its entirety, into the present application.

TECHNICAL FIELD

The present invention relates to a film and a method of producing the same.

BACKGROUND ART

An ethylene-tetrafluoroethylene copolymer film is lightweight, has excellent weather resistance, mechanical strength, and the like, and is therefore used as a membrane structure film constituting a membrane structure. The membrane structure is a structure in which a roof and an outer wall are made of a membrane structure film, and is used in various facilities. Particularly in recent years, membrane structures have been increasingly adopted in large facilities such as American football and soccer stadiums and shopping centers.

There are a cushion method and a tension method as a method of installing a membrane structure film. In the cushion method, a plurality of membrane structure films are fixed to a framework such that a multi-layer membrane is formed, and the air is supplied between films. In the tension method, a single membrane structure film is fixed to a framework. The cushioning method is characterized by a wide span of framework between films and excellent heat insulating properties. The tension method is characterized in that it is inexpensive and does not require air supply equipment. In recent years, with the increase in the size of membrane structures, the tension method with low installation cost has been increasing.

Membrane structure films may be required to have transparency as well as weather resistance and mechanical strength.

Patent Document 1 describes an ethylene-tetrafluoroethylene copolymer film having a thickness of 200 µm and a haze of 10.8% or 12.5%.

RELATED ART DOCUMENTS

Patent Documents

Patent Document 1: Japanese Patent No. 4677712

SUMMARY OF INVENTION

Technical Problem

However, according to the findings of the present inventors, the ethylene-tetrafluoroethylene copolymer film of Patent Document 1 is transparent, but has a higher haze than glass and is milky white. In the cushion method, since two or more films are used, the multi-layer membrane as a whole becomes milky white with low transparency. In the tension method, the transparency is higher than that in the cushion method, but when a view or the like is seen through the film, the color tone and the outline become unclear, and a designability through the film is inferior.

Meanwhile, a transparent film having a low haze tends to have conspicuous scratches when scratched during processing or mounting of the film.

Further, according to the findings of the inventors, the conventional ethylene-tetrafluoroethylene copolymer films have a lower visible light reflectance than glass, but have a high ultraviolet (hereinafter also referred to as "UV") reflectance. High reflectance may cause inflammation of the cornea of the eye, which might lead to severe pain and redness.

In the cushion method, in many cases, the film shape is arcuate and thus the reflected light received by sunlight in the sky has different incident angles. Therefore, the reflected angles are also different, and the reflected light is easily dispersed, which is unlikely to result in strong reflected light. However, in the tension method, since the film shape is often flat, the reflected light is unlikely to be dispersed, and an angles and time Zone with strong reflected light appear.

An object of the present invention is to provide a film which has excellent designability through the film, is inconspicuous even when scratched and is eye-friendly, and a method of producing the same.

Solution to Problem

The disclosures are to provide a film having a feature of any one of the following [1] to [11], and a method of producing the same.

[1] A film comprising a copolymer having a tetrafluoroethylene-based unit and an ethylene-based unit, in which the film has a haze of from 1.2% to 8.0%, an ultraviolet reflectance of less than 17.0%, and a thickness of from 250 to 400 µm.

[2] The film according to [1], in which the film has a rate of dimensional change in each of MD and TD of respectively from −3.5% to −1.0% when heating is carried out at 150° C. for 10 minutes and then cooling is carried out to 23° C., based on dimensions of the film at 23° C.

[3] The film according to [1] or [2], in which the film has a stress at 10% extension in each of MD and TD at 80° C. of respectively 3.0 MPa or more.

[4] The film according to any one of [1] to [3], in which a content of the copolymer is 90% by mass or more with respect to a total mass of the film.

[5] The film according to any one of [1] to [4], in which:
the copolymer has another unit based on a different monomer other than tetrafluoroethylene and ethylene; and
a total content of the other unit is from 1 to 7 mol % with respect to a total of the tetrafluoroethylene-based unit and the ethylene-based unit.

[6] The film according to any one of [1] to [5], which is a membrane structure film.

[7] A method of producing the film according to any one of [1] to [6], the method comprising: obtaining a melt by melting the copolymer; continuously extruding the melt through a die to form the melt into a sheet shape; and passing the melt in sheet shape between a pair of two rolls to cool the melt, in which:
a surface temperature of each of the two rolls can be controlled with a heating medium;
one of the two rolls is a rigid roll, and the other is an elastic roll;

the two rolls are pressed against each other with a linear pressure of from 0.1 to 1,000 N/cm;

a temperature of the melt immediately before passing between the two rolls is from 200° C. to 330° C.; and an average of heating medium temperatures of the two rolls is from 40° C. to 180° C.

[8] The method of producing the film according to [7], the method further comprising, after passing the melt between the two rolls to cool the melt, further cooling the melt by contacting the melt with a subsequent stage roll placed at a subsequent stage, in which:

a surface temperature of the subsequent stage roll can be controlled by a heating medium, and a heating medium temperature of the subsequent stage roll is 100° C. or less. [9] A method of producing the film according to any one of [1] to [6], the method comprising: obtaining a melt by melting the copolymer; continuously extruding the melt through a die to form the melt into a sheet shape; and cooling the melt in sheet shape by contacting the melt with a rigid roll or an elastic roll, and a subsequent stage roll placed at a subsequent stage, in which:

a surface temperature of each of the rigid roll or the elastic roll, and the subsequent stage roll, can be controlled with a heating medium;

a temperature of the melt immediately before being in contact with the rigid roll or the elastic roll is from 200° C. to 330° C.; and an average of a heating medium temperature of the rigid roll or the elastic roll, and a heating medium temperature of the subsequent stage roll, is from 40° C. to 180° C.

[10] The method of producing the film according to [9], in which the heating medium temperature of the subsequent stage roll is 100° C. or less.

[11] A method of producing the film according to any one of [1] to [6], the method comprising: obtaining a melt by melting the copolymer; continuously extruding the melt through a die to form the melt into a sheet shape; and passing the melt in sheet shape between a pair of a rigid roll and an elastic roll or bringing the melt into contact with a rigid roll or an elastic roll, and a subsequent stage roll placed at a subsequent stage, for cooling, in which:

a surface temperature of each of the rigid roll, the elastic roll and the subsequent stage roll can be controlled with a heating medium, a temperature of the melt immediately before passing between the rigid roll and the elastic roll or immediately before being in contact with the rigid roll or the elastic roll is from 200° C. to 330° C., a melting point M of the copolymer is 200° C. or more, and in a case in which an average of a heating medium temperature of the rigid roll and a heating medium temperature of the elastic roll or an average of a heating medium temperature of the rigid roll or the elastic roll and a heating medium temperature of the subsequent stage roll is designated as T (° C.), T×M is 31,000 or less.

Advantageous Effects of Invention

A film in the present invention is excellent in designability through the film, is inconspicuous even when scratched, and is eye-friendly.

A method of producing a film can provide a film which has excellent designability through the film, is inconspicuous even when scratched, and is eye-friendly.

DESCRIPTION OF EMBODIMENTS

The meanings of the following terms in the present invention are as follows.

The "monomer-based unit" is a general term for an atomic group directly formed by polymerizing one molecule of a monomer and an atomic group obtained by chemically converting a part of the atomic group. The term "monomer-based unit" used herein is also simply referred to as "monomer unit."

The term "monomer" means a compound having a polymerizable unsaturated bond such as a polymerizable carbon-carbon double bond.

The "melting point" is the temperature corresponding to the maximum value of the melting peak of resin as measured by the differential scanning calorimetry (DSC) method.

The term "MD" means a flow direction (machine direction), and the term "TD" means a direction transverse to MD (transverse direction).

The "haze" is a value measured in accordance with JIS K7136:2000.

The "visible light transmittance" is a value measured in accordance with DIN EN 410:1998.

The "ultraviolet reflectance" (UV reflectance) is a value measured in accordance with DIN EN 410:1998.

The "rate of dimensional change" is a value measured in accordance with JIS K7133:1999.

The "stress at 10% extension" is a value measured in accordance with JIS K7127:1999.

The expression "excellent designability through the film" indicates that the color tone and the outline of a view or the like are clear when the view or the like is seen through the film, which means that there is little difference from when the view or the like is seen directly without through the film.

The term "rigid roll" means a roll constructed by cylinder, in which a Young's modulus of a material of an outermost layer at the impression cylinder is $5 \times 10^4$ MPa or more and a wall thickness is 2 mm or more.

The term "elastic roll" means a roll constructed by cylinder, in which a Young's modulus of a material of an outermost layer at the impression cylinder is less than $5 \times 10^4$ MPa, or a roll constructed by cylinder, in which the Young's modulus is $5 \times 10^4$ MPa or more and a wall thickness is less than 2 mm.

The expression "immediately before passing between the two rolls" means positioning 10 mm away from the narrowest point between the two rolls in the upstream direction (die direction).

The expression "to" indicating a numerical range means that the numerical values described before and after the numerical range are included as the lower limit value and the upper limit value.

Figure 1:
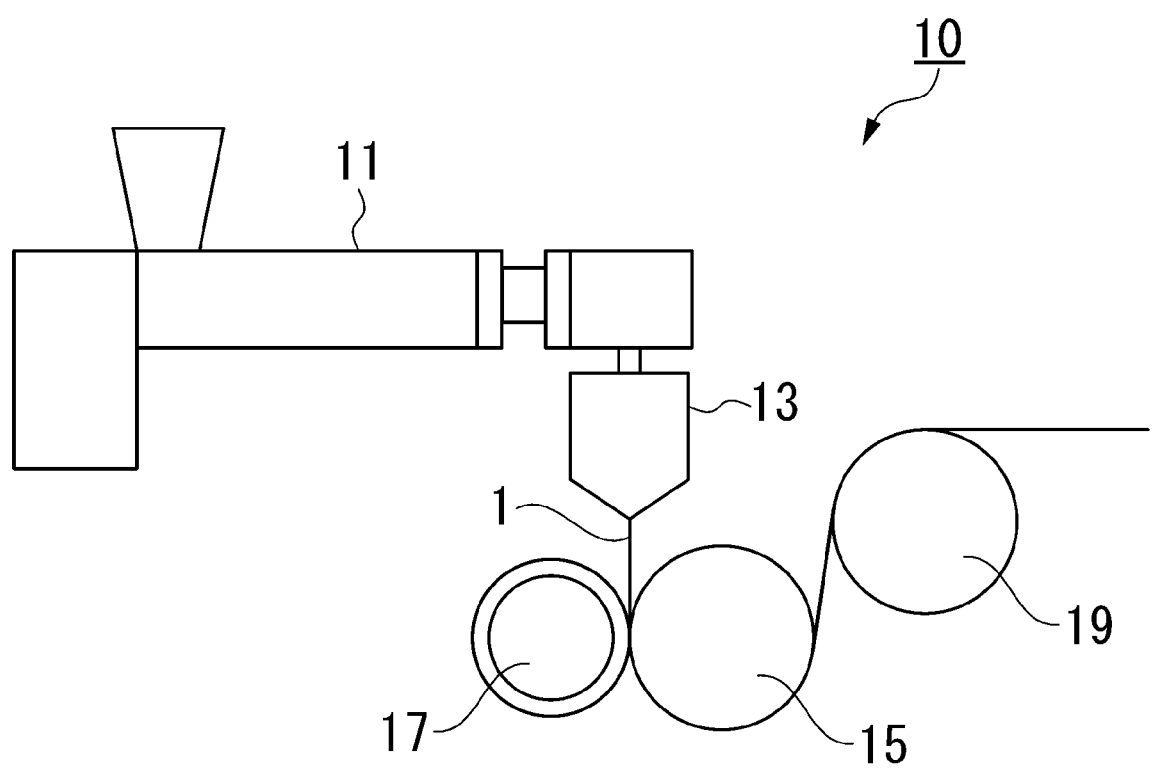
FIG. 1 is a schematic view illustrating the forming method 1.
Figure 2:
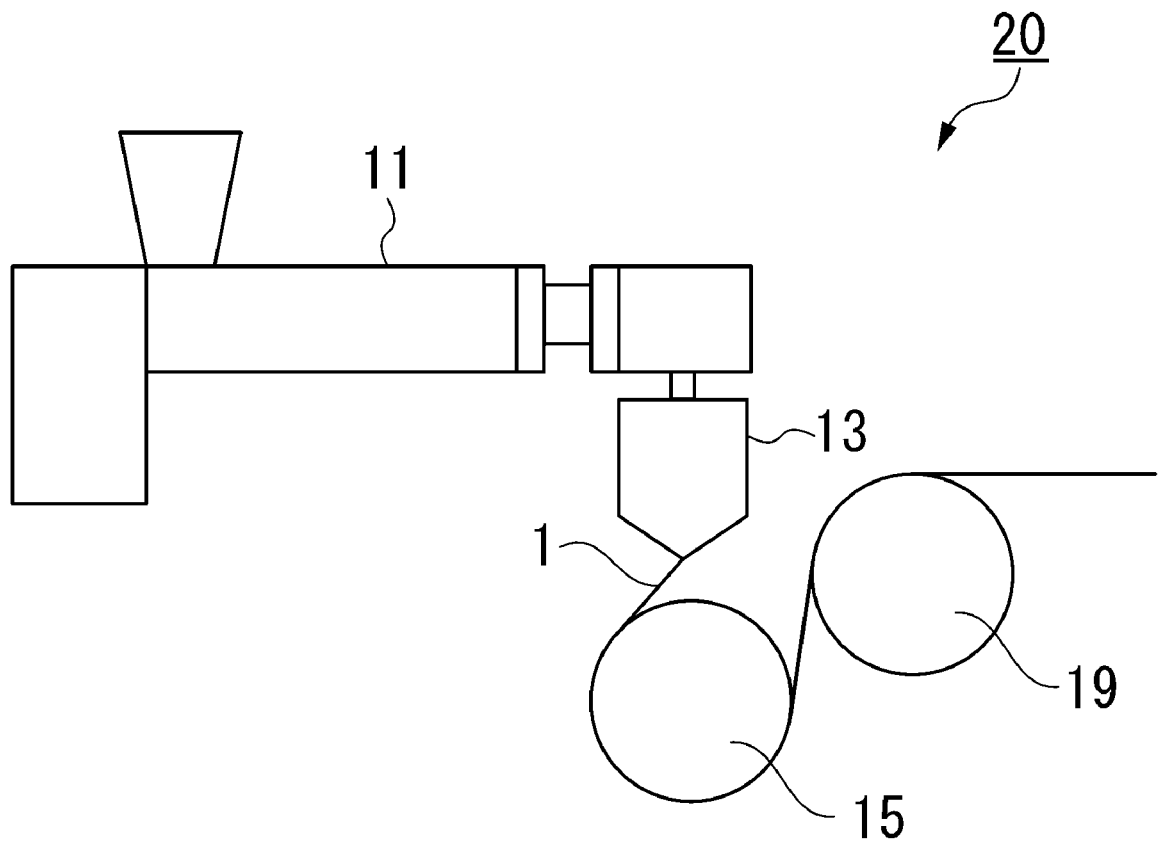
FIG. 2 is a schematic view illustrating the forming method 2.

The dimensional ratios in FIGS. 1 and 2 may be different from the actual ones for convenience of explanation.

[Film]

The film of the present invention (hereinafter also referred to as "the film") is a film including a copolymer (hereinafter also referred to as "ETFE") having a unit based on tetrafluoroethylene (hereinafter also referred to as "TFE") and a unit based on ethylene (hereinafter also referred to as "E"), in which the film whose a haze is from 1.2% to 8.0%, an ultraviolet reflectance is less than 17.0%, and a thickness is from 250 to 400 μm.

The film may further include other components other than ETFE as long as the performance is not impaired.

In ETFE, a molar ratio of the TFE unit and the E unit (hereinafter also referred to as "TFE/E ratio") is preferably from 40/60 to 60/40 and particularly preferably from 45/55 to 56/44 in consideration of the high melting point of ETFE.

It is preferable that ETFE has a unit based on a different monomer other than TFE and E. ETFE having a different monomer unit has lowered crystallinity and thus the film has a lowered haze. An UV reflectance is also lowered.

Examples of the different monomer which may be copolymerized with TFE and E include: a vinyl monomer having a fluoroalkyl group; an olefin such as propylene or butene (excluding E); a fluoroolefin having a hydrogen atom in an unsaturated group such as vinylidene fluoride, vinyl fluoride, or trifluoroethylene; a fluoroolefin that does not have a hydrogen atom in an unsaturated group such as chlorotrifluoroethylene (excluding TFE); perfluoro(alkyl vinyl ether) such as perfluoro(propyl vinyl ether); a vinyl ether such as alkyl vinyl ether, (fluoroalkyl)vinyl ether, glycidyl vinyl ether, hydroxybutyl vinyl ether, or methyl vinyloxybutyl carbonate; a vinyl ester such as vinyl acetate, vinyl chloroacetate, vinyl butanoate, vinyl pivalate, vinyl benzoate, or vinyl crotonate; and a (meth)acrylate such as (polyfluoroalkyl)acrylate or (polyfluoroalkyl)methacrylate. These different monomers may be used singly, or in combination of two or more kinds thereof.

At least one different monomer is preferably a fluorine-containing vinyl monomer represented by the following Formula 1 because ETFE has excellent heat resistance, fuel barrier properties, and stress crack resistance. The fluorine-containing vinyl monomer represented by Formula 1 may be used in combination with a different monomer.

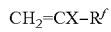   Formula 1

Note that X represents a hydrogen atom or a fluorine atom, and $R^f$ represents a fluoroalkyl group.

As X, a hydrogen atom is preferable because it is excellent in polymerizability.

As $R^f$, a fluoroalkyl group having 1 to 8 carbon atoms is preferable, a perfluoroalkyl group having 1 to 8 carbon atoms is more preferable, and a perfluoroalkyl group having 2 to 6 carbon atoms is particularly preferable. $R^f$ may be linear or branched. Specific examples of $R^f$ include a pentafluoroethyl group, a nonafluorobutyl group, and a tridecafluorohexyl group.

A total content of a different monomer unit is preferably from 1 to 7 mol %, more preferably from 1.4 to 6 mol %, still more preferably from 1.5 to 6 mol %, and particularly preferably from 2 to 4 mol % with respect to the total of the TFE unit and the E unit. In a case in which the total content of a different monomer unit is the lower limit value or more, the crystallinity of ETFE decreases such that a film having a low haze and a low UV reflectance is likely to be obtained. In a case in which the total content of a different monomer unit is the upper limit value or less, the melting point of ETFE is high and thus a film having high stress at 10% extension in a high-temperature range of 80° C. or the like is likely to be obtained.

The melting point of ETFE is preferably 200° C. or more, more preferably 210° C. or more, still more preferably 225° C. or more, and particularly preferably 240° C. or more. In a case in which the melting point is 200° C. or more, the film may be used as a membrane structure film in various regions. Even when the melting point is less than 200° C., the film may be used as a membrane structure film, however, regions, where the film can be used, may be limited to regions where the annual maximum temperature is less than 30° C., for example.

The upper limit of the melting point of ETFE is not particularly limited, but is, for example, 270° C.

The melting point of ETFE may be adjusted based on the TFE/E ratio and the content of a different monomer unit. For example, in a case in which the content of a different monomer unit is more than 2.5 mol % with respect to the total of the TFE unit and the E unit, the melting point of ETFE is often below 250° C.

The volumetric flow rate of ETFE (hereinafter also referred to as "Q value") is preferably from 1 to 50 mm$^3$/sec and particularly preferably from 2 to 30 mm$^3$/sec. In a case in which the Q value is in the range, it is easy to produce a film having a uniform thickness.

The Q value is measured using a flow tester under the conditions of a cylinder area of 1 cm$^2$, a temperature of 297° C., and a load of 7 kg.

ETFE may be used singly, or two or more kinds of ETFE having different compositions (the TFE/E ratio, content of the different monomer unit, and the like) may be used in combination in order to adjust the haze, UV reflectance, and the like.

A content of ETFE in this film is preferably 70% by mass or more, more preferably 85% by mass or more, still more preferably 90% by mass or more, and particularly preferably 95% by mass or more with respect to the total mass of the film. The upper limit value of the content of ETFE is not particularly limited, and may be 100% by mass. In a case in which the content of ETFE is the lower limit value or more, the film has more excellent weather resistance and mechanical strength.

Examples of other components include a resin other than ETFE and additives.

Examples of a resin other than ETFE include a fluororesin other than ETFE and a non-fluororesin. Examples of the fluororesin other than ETFE include polyvinylidene fluoride, ethylene-chlorotrifluoroethylene-based copolymer, and fluoroolefin-based copolymer (but except ETFE) having a fluoroolefin unit and at least one polar group selected from the group consisting of a hydroxyl group, carboxy group, an amide group, and a glycidyl group. Examples of the non-fluororesin include Nylon 6 and Nylon 12.

Examples of the additives include a pigment, a UV absorber, an antioxidant, and an antistatic agent.

A pigment may be added to the film in order to color the film and control visible light or UV transmittance.

Known inorganic pigments and organic pigments may be used as the pigment. Examples thereof include titanium oxide (white), zinc oxide (white), aluminum-cobalt composite oxide (blue), carbon black (black), composite oxide of tin, zinc, and titanium (orange), iron oxide (red), cobalt-nickel-zinc-titanium composite oxide (green), cobalt-magnesium-titanium composite oxide (green), bismuth vanadate composite oxide (yellow), nickel-antimony-titanium composite oxide (yellow), titanium-antimony-nickel composite oxide (yellow), zinc-iron composite oxide (brown), cobalt-nickel-silicon composite oxide (purple), cobalt-lithium-phosphorus composite oxide (purple), manganese oxide (purple), phthalocyanine (blue, green), and quinacridone (red, purple). These pigments may be used singly, or in combination of two or more kinds thereof.

The content of the pigment is, for example, from 0.0001% to 2% by mass with respect to the mass of the resin.

By allowing the film to contain a UV absorber, the UV reflectance and UV transmittance of the film may be reduced.

Examples of the UV absorber include an inorganic UV absorber and an organic UV absorber.

Examples of the inorganic UV absorber include inorganic particles of zinc oxide, titanium oxide, cerium oxide, iron oxide, or the like; and inorganic composite particles obtained by coating the surface of the inorganic particles with an inorganic substance such as silica, alumina, or zirconia.

Examples of the organic UV absorber include a triazine-based UV absorber and a benzophenone-based UV absorber, and a triazine-based UV absorber is preferable. Of these, hydroxyphenyltriazine-based UV absorbers such as 2-(2-hydroxy-4-[1-Octyloxycarbonylethoxy]phenyl)-4,6-bis(4-phenylphenyl)-1,3,5-triazine (e.g., trade name: TINUVIN 479 manufactured by BASF Japan Ltd.), 2,4-bis[2-hydroxy-4-butoxyphenyl]-6-(2,4-dibutoxyphenyl)-1,3,5-triazine (e.g., trade name: TINUVIN 460 manufactured by BASF Japan Ltd.), and 2-[4-[(2-hydroxy-3-(2'-ethyl)hexyloxy]-2-hydroxyphenyl]-4,6-bis(2,4-dimethylphenyl)-1,3,5-triazine (e.g., trade name: TINUVIN 405 manufactured by BASF Japan Ltd.) are preferable.

These UV absorbers may be used singly, or in combination of two or more kinds thereof.

In a case in which the film contains a particulate component as the other components such as a UV absorber (hereinafter also referred to as "particulate component"), a particulate component having a particle size of more than 0.2 μm may have a risk of scattering the light incident on the film and increasing the haze.

It is preferable that the film contains a particulate component having a particle size of more than 0.2 μm at a minimum content. It is particularly preferable that the film does not contain a particulate component having a particle size of more than 0.2 μm.

The particle size of the particulate component in the film may be controlled based on the particle size of a particulate component to be mixed with ETFE or by the surface-treatment method for the dispersion of the particulate component, or the like.

The film may be a single layer or a multi-layer. A single-layer film is preferred because it is easier to control the thermal cooling rate of a melted film in the case of a single-layer film than in the case of a multilayer film in which delamination should also be taken into consideration.

In a case in which the film has a plurality of layers, the film may be one in which a plurality of ETFE layers are layered, or may be one in which at least one ETFE layer and at least one other layer are layered.

The ETFE layer is a layer containing ETFE, and may contain other components (e.g., a UV absorber). It is preferable that the ETFE layer consists of ETFE alone.

The other layer is a layer containing other components but not ETFE.

One preferred aspect of the film in a case in which the film is a multi-layer includes a multi-layer film having an ETFE film and a UV absorber layer that is layered on at least one surface of the ETFE film. The UV absorber layer contains a UV absorber, and may further contain a resin, an additive other than the UV absorber, and the like as necessary.

It is preferable that the UV absorber layer is a coating layer containing a UV absorber. The coating layer is formed by, for example, applying a coating agent containing a UV absorber, a liquid medium, and as necessary, an additive other than a resin and a UV absorber to the surface of the ETFE layer (ETFE film) and drying it. It is preferable that the surface of the ETFE layer is surface-treated by corona discharge or the like.

As a resin for the UV absorber layer, a fluoroolefin-based copolymer having a fluoroolefin unit and at least one polar group selected from the group consisting of a hydroxyl group, a carboxy group, an amide group, and a glycidyl group is preferable in terms of excellent weather resistance and adhesion to the surface of the surface-treated ETFE layer.

A fluoroolefin may have a hydrogen atom as an unsaturated group or may not have a hydrogen atom as an unsaturated group. Specific examples thereof include the same as described above.

The fluoroolefin-based polymer may have a monomer unit other than the fluoroolefin unit. Examples of other monomers include different monomers in ETFE (excluding a fluoroolefin) and ethylene.

The fluoroolefin-based polymer may have a main-chain terminal group containing the polar group, or may have a monomer unit containing the polar group.

Commercially available products may be used as the fluoroolefin-based polymer. Examples of commercially available products include LUMIFLON (registered trademark) series (e.g., LF200, LF100, LF710, LF600) (manufactured by AGC Inc.), ZEFFLE (registered trademark) GK series (e.g., GK-500, GK-510, GK-550, GK-570, GK-580) (manufactured by DAIKIN INDUSTRIES, LTD.), FLUONATE (registered trademark) series (e.g., K-700, K-702, K-703, K-704, K-705, K-707) (manufactured by DIC Corporation), and ETERFLON series (e.g., 4101, 41011, 4102, 41021, 4261A, 4262A, 42631, 4102A, 41041, 41111, 4261A) (manufactured by Eternal Chemical Co., Ltd.).

A haze of the film is from 1.2% to 8.0% and particularly preferably from 3.0% to 5.0%. In a case in which the haze is the lower limit value or less, even when the film has scratches, creases, dents, and the like, they are not noticeable, while in a case in which the haze is the upper limit value or less, designability through the film is excellent.

Although scratches, creases, dents and the like that occur when processing a transparent film for manufacturing a membrane structure and heat-sealed lines that join films together do not affect the strength of the film at all, are easily noticeable and subject to poor appearance, and therefore have conventionally been a cause of great caution during film processing and installation. By making them inconspicuous, the productivity of membrane structures and the like is improved.

The method of adjusting the haze will be described in detail later.

A visible light transmittance of the film is preferably 85% or more, and particularly preferably 90% or more. In a case in which the visible light transmittance is at least the lower limit value or more, the designability through the film is more excellent.

The higher the visible light transmittance is, the more preferable it is, and the upper limit thereof is not particularly limited.

An UV reflectance of the film is less than 17.0%, preferably 15.0% or less, and particularly preferably less than 10.0%. In a case in which the UV reflectance is the upper limit value or less, the reflected light generated when the film is exposed to sunlight, or the like may be made to have low UV intensity and be eye-friendly.

The lower the UV reflectance, the more preferable it is, and the lower limit thereof is not particularly limited.

The method of adjusting the UV reflectance will be described in detail later.

A stress at 10% extension of the film at 80° C. in each of MD and TD is respectively preferably 3.0 MPa or more, more preferably 4.0 MPa or more, and particularly preferably 7.0 MPa or more. The upper limit of the stress at 10% extension is not particularly limited, but is, for example, 12.0 MPa.

A membrane structure using an ETFE film as a membrane structure film is generally designed such that a stress of from 1.5 to 3 MPa is applied to the membrane structure film. The maximum temperature of a membrane structure film in the actual environment of a membrane structure is the temperature of a portion in contact with a metal frame in the midsummer sunny weather, and is about 80° C. at the maximum. In a case in which the stress at 10% extension at 80° C. is the lower limit value or more, even when the film is stressed for a long time in the actual environment of the membrane structure, it is possible to prevent the film from being extremely loosened.

Further, it is preferable that the membrane structure film has a high stress at 1% to 10% extension from the viewpoint of mechanical strength. In a case in which the stress at 10% extension at 80° C. is the lower limit value or more, the film has excellent mechanical strength, and the span of a framework between films may be lengthened such that it is easy to obtain a sense of visual openness.

Meanwhile, in a case in which the stress at 10% extension at 80° C. is less than the lower limit value, when a membrane structure film is installed by the tension method (single layer), it is necessary to pay a lot of attention on the method of expanding the film. In the cushion method, air can be introduced between layers after installation so as to introduce tension corresponding to rain and snow. Thus, it is possible to prevent ponding in which a dent is generated, and rain collects in the dent. However, in the tension method, usually, the tension introduced is all the tension introduced at the initial stage, and it is not assumed that the operation of applying the tension again when the film becomes loose after the installation. Therefore, it is important how the film is stretched up, down, left and right, thereby introducing tension at the time of installation. The method of introducing tension is a method in which one of the four sides of the film on the top, bottom, left and right is fixed, and the remaining three sides are fixed while being pulled manually or a method in which after fixing the four sides of the film, an arc-shaped protruding pole is inserted, thereby giving the film a bulge. The cushion method is preferable from the viewpoint of the ease of installation and suppressing tearing of the film.

The rate of dimensional change in each of MD and TD based on the dimension of the film when heating is carried out at 150° C. for 10 minutes and then cooling is carried out to 23° C. is respectively preferably from −3.5% to 1.0%, and particularly preferably from −2.5% to −1.5%.

The melting point of ETFE is generally from 250° C. to 270° C. Therefore, an ETFE film is usually used only in a portion where the temperature of smoke generated during a fire is 200° C. or less and particularly 150° C. or less.

Therefore, the maximum temperature for use is set to 150° C. for measuring the rate of dimensional change on heating.

The temperature of a membrane structure film in an actual environment of a membrane structure is about 80° C. at the maximum as described above. Plastics expand thermally when heat rises. Assuming that the coefficient of linear expansion of ETFE is approximately $1 \times 10^{-4}$, if a film at 23° C. becomes 80° C., it is considered that the film expands by about 0.6%. A film having a negative rate of dimensional change on heating shrinks when it receives heat. For example, assuming that the rate of dimensional change is proportional to the temperature, a film having a rate of dimensional change in each of MD and TD of −2% is expected to shrink by about from 0.6% to 1% with a thermal change of from 23° C. to 80° C. It is therefore considered that the film does not loosen in a temperature range of from 23° C. to 80° C. In such manner, in a case in which the rate of dimensional change on heating in each of MD and TD is respectively the upper limit value or less, it is possible to prevent the stretched membrane structure film from loosening in the actual environment of the membrane structure. Accordingly, there is no need to expand the film while stretching it. After expansion, tension may be instantly introduced by applying hot air of about from 60° C. to 150° C. with a hot air supply device such as a dryer. Meanwhile, in the case of a film having a rate of dimensional change on heating in at least one of MD and TD of more than −1.0%, if the film is not expanded while being stretched, the film may loosen in the actual environment of the membrane structure, especially in summer.

In a case in which the rate of dimensional change on heating in each of MD and TD is the lower limit value or more, when films are joined together by heat sealing, wrinkles are less likely to occur on the films, and their dimensions tend to be shaped as planned.

The method of adjusting the rate of dimensional change on heating in each of MD and TD of a film, for example, includes a method in which after film forming, a tenter is attached to the edge of a film to stretch the film in the horizontal direction, or the speed ratio of the take-up roll is changed to stretch the film in the vertical direction. However, the easiest method is a method in which a melt extruded from a die is rapidly cooled during film forming. Rapid cooling of the melt extruded from the die allows the film to be shaped and immobilized before the original shrinkage due to temperature changes is complete. At this time, since the shrinking force remains inside the film, when the temperature of the film rises and the film is allowed to move freely, the film shrinks due to the original dimensional change.

A thickness of the film is from 250 to 400 μm and preferably from 250 to 300 μm. In a case in which the thickness is the lower limit value or more, the film has excellent resistance to wind and snow, and the film is not torn due to the collision of wood chips, pebbles, and the like. In a case in which the thickness is the upper limit value or less, the transparency of the film is excellent and the designability through the film is excellent. In addition, the film has a low UV reflectance and is eye-friendly.

The film is suitable as a membrane structure film, and in particular, the film is suitable as a membrane structure film for the tension method.

A membrane structure film is used as a membrane material that constitutes a membrane structure. A membrane structure is a structure in which at least a part of a roof, an outer wall, or the like is made of a membrane material. Examples of the membrane structure include sports facilities (pool, gymnasium, tennis court, soccer field, American football stadium, and the like), warehouses, meeting places, exhibition halls, horticultural facilities (horticultural houses, agricultural houses, and the like), shopping centers, parking lots, bicycle parking lots, zoos, and barn.

The film may be used for, for example, open-air theater screens, yacht canvas, road signs, mold-release films as well as membrane structure films.

[Method of Producing Film]

To produce a film having a haze of from 1.2% to 8.0%, a UV reflectance of less than 17.0%, and a thickness of 250 to 400 μm, there are the following approaches: (1) approach from the composition of ETFE; (2) approach from the film forming method; (3) approach based on both (1) and (2).

An ETFE film is formed by, for example, melting ETFE, continuously extruding the obtained melt through a die to form the melt into a sheet shape having a predetermined thickness, and cooling the melt. When cooling the melt, the melt is brought into contact with a roll that is placed directly after the die and that is adjusted to a predetermined heating medium temperature.

The haze and UV reflectance of the film formed in this way vary depending on the composition of ETFE constituting the film and the cooling rate during forming. The composition of ETFE affects the crystallinity of ETFE. In a case in which the film is deviated from the alternating copolymerization of TFE and E by shifting the above-described TFE/E molar ratio from 1, polymerizing a different monomer or the like, the crystallinity of ETFE is lowered, and thus the haze and UV reflectance of the film are lowered. Even in a case in which the crystallinity of ETFE is high, by cooling more rapidly during film forming, the crystal growth of ETFE is suppressed, and the haze and UV reflectance of the film are lowered. Further, the haze will be more lowered when it is possible to form the film surface smoothly.

In the approach of (1), a low-crystallinity composition is used as ETFE.

For example, the higher the content of a different monomer unit in ETFE, the lower the crystallinity of ETFE. Even in a case in which ETFE is formed by the forming method 2 (general forming method) described later, a film satisfying the above-described haze and UV reflectance may be produced.

In the case of producing a film satisfying the above-described haze and UV reflectance by the forming method 2, a total content of a different monomer unit is preferably more than 2.5 mol %, and particularly preferably 3 mol % or more with respect to a total of 100 mol % of the TFE unit and the E unit.

The total content of a different monomer unit is preferably 7 mol % or less, more preferably 6 mol % or less, and particularly preferably 4 mol % or less with respect to a total of 100 mol % of the TFE unit and the E unit.

In the approach of (2), the melt of ETFE is rapidly cooled. In this case, even in a case in which the total content of a different monomer unit for ETFE used is 2.5 mol % or less with respect to the total of 100 mol % of the TFE unit and the E unit, a film satisfying the above-described haze and UV reflectance may be produced.

To rapidly cool the melt, for example, ETFE is formed by the forming method 1 described later. In the forming method 1, the melt is passed between a pair of two rolls such that rapid cooling is possible. In the case of the forming method 2, rapid cooling is difficult because only one surface of the melt comes into contact with the rolls.

At the time of rapid cooling, the temperature decrease rate in the region of ±20° C. of the crystallization temperature of ETFE is preferably 5° C./sec or more, and particularly preferably 10° C./sec or more.

In addition to any of the approaches (1) to (3), a method of using an UV absorber may also be used. The UV reflectance may be further lowered by blending a UV absorber with ETFE to form a film or by providing a UV absorber layer on the ETFE film.

The forming methods 1 and 2 will be described in more detail below.

(Forming Method 1)

In the forming method 1, a melt is obtained by melting ETFE, the melt is continuously extruded through a die to form the melt into a sheet shape and allowed to pass between a pair of two rolls to cool. Accordingly, a film is obtained.

One of the two rolls is a rigid roll, and the other is an elastic roll.

Generally, one of the two rolls is a take-up roll (hereinafter also referred to as "C1 roll") that takes up the melt, and the other roll is a pressing roll that presses the melt against the C1 roll (hereinafter also referred to as "C0 roll"). The C1 roll may be a rigid roll and the C0 roll may be an elastic roll, or the C1 roll may be an elastic roll and the C0 roll may be a rigid roll. The C0 roll is also referred to as a backup roll.

A surface temperature of each of the C1 roll and the C0 roll may be controlled by a heating medium.

A C2 roll is provided after the C1 roll as necessary, and the melt (film) that has moved along the C1 roll and cooled is peeled off from the C1 roll, and further cooled by the C2 roll. A surface temperature of the C2 roll may also be controlled by a heating medium. The C2 roll preferably has a temperature controlling function because it has a function of peeling off the film from the C1 roll and making the cooling rate of the film uniform in the width direction.

<Forming Apparatus>

FIG. 1 is a schematic view showing an embodiment of the forming apparatus used in the forming method 1.

The forming apparatus 10 includes: an extruder 11; a die 13 connected to the extruder 11; a pair of a C1 roll 15 and a C0 roll 17; a C2 roll 19; and a winder (not shown).

The C1 roll 15 and the C0 roll 17 are arranged such that the melt 1 extruded through a die 13 into a sheet shape can pass therebetween.

The extruder 11 melts ETFE and continuously extrudes it from the die 13 at an arbitrary extrusion rate. The extruder 11 is not particularly limited, and a known extruder such as a single-screw extruder or a twin-screw extruder may be used.

The die 13 forms ETFE melted by the extruder 11 into a sheet shape. Examples of the die 13 include a flat die (also referred to as "T die").

In this embodiment, C1 roll 15 is a rigid roll. As the rigid roll, any rigid roll may be used as long as the temperature of the heating medium can be adjusted, and a known cooling roll or the like may be used.

One example of the rigid roll may be a roll having an inner cylinder attached to a rotating shaft and an outer cylinder arranged on the outside of the inner cylinder, which is configured to flow or hold a heating medium (cooling medium) between the inner cylinder and the outer cylinder. In such a rigid roll, the surface temperature of the rigid roll, that is, the surface temperature of the rigid roll can be controlled by flowing a heating medium heated or cooled to an arbitrary temperature between the inner cylinder and the outer cylinder, or heating or cooling a heating medium held between the inner cylinder and the outer cylinder to an arbitrary temperature.

A wall thickness of the outer cylinder is preferably 2 mm or more, more preferably from 3 to 30 mm, and particularly preferably from 5 to 20 mm. In a case in which the wall thickness is the lower limit value of the range or more, the rigid roll is less likely to deform when pressurized with an elastic roll or the like. In a case in which the wall thickness is the upper limit value of the range or less, temperature exchangeability with the heating medium is excellent. In addition, the weight of the outer cylinder may be suppressed.

As the material of the rigid roll (outer cylinder, inner cylinder, or the like), a material having a Young's modulus of $5 \times 10^4$ MPa or more is preferable. Further, a material having high heat resistance is preferable because it comes into contact with a high-temperature ETFE melt. Examples of the material having high heat resistance include metals and ceramics. From the viewpoint of workability, metals are preferable. Examples of the metals include steel, stainless steel, aluminum alloy, and nickel alloy.

In a case in which the rigid roll is made of a metal, the surface of the rigid roll may be surface-modified by ceramic coating, ceramic sintering, ceramic vapor deposition, super hard metal spraying, plating, carburizing, nitridation, or the like in order to increase the hardness.

The smaller the surface roughness of C1 roll 15, the more preferable. The smaller the surface roughness, the smoother the film surface and the lower the haze of the film. In a case in which the surface roughness is large, when the sheet-shaped melt 1 is brought into contact with the C1 roll 15, the uneven shape of the surface of the C1 roll 15 may be transferred to the surface of the melt, resulting in a high haze of the film.

The surface roughness of the C1 roll 15 is controlled by either the arithmetic average roughness Ra or the maximum height Ry. Ra is measured in accordance with JIS B0601:2001. Ry is measured in accordance with JIS B0601:1994.

Ra on the surface of the C1 roll 15 is preferably 0.8 µm or less, more preferably 0.5 µm or less, and particularly preferably 0.3 µm or less.

Ry on the surface of the C1 roll 15 is preferably 1 s or less, and particularly preferably less than 0.3 s.

In this embodiment, C0 roll 17 is an elastic roll. The elastic roll may be any one that can adjust the surface temperature. Examples of the elastic roll include a coated roll with a coating consisting of a material selected from the group consisting of rubber, elastomer, and plastic on the surface and a flexible metal roll.

Examples of the coated roll include a roll having an inner cylinder attached to a rotating shaft, an outer cylinder arranged on the outside of the inner cylinder, and the coating that covers the outer peripheral surface of the outer cylinder, which is configured to flow or hold a heating medium (cooling medium) between the inner cylinder and the outer cylinder.

The outer cylinder and the inner cylinder may be the same as those mentioned for the rigid roll, respectively.

Examples of the rubber constituting the coating include silicone rubber, ethylene propylene rubber (EPDM), neoprene rubber, and fluororubber. Examples of the elastomer include polyester-based, urethane-based, and polyamide-based elastomers. Examples of the plastic include fluororesin, polysulfone, and polyamide.

The Young's modulus (=tensile elasticity) of the material (rubber, elastomer, plastic) constituting the coating is preferably from 1 to $5 \times 10^4$ MPa and particularly preferably from 3 to $5 \times 10^3$ MPa.

A thickness of the coating is preferably 0.25 mm or more, more preferably from 0.5 to 30 mm, and particularly preferably from 1 to 20 mm. In a case in which the thickness is the lower limit value of the range or more, when the melt of ETFE passes between the rigid roll and the elastic roll, the elastic roll is sufficiently deformed, and thus internal strain is less likely to occur. In a case in which the thickness is the upper limit value of the range or less, temperature exchangeability with the heating medium is excellent.

Examples of the flexible metal roll include a roll having a flexible outer cylinder made of metal and a soft foundation arranged inside the outer cylinder adjacent to the outer cylinder. In such a roll, since the outer cylinder of the outermost layer has flexibility, the surface is deformed when pressed by a rigid roll or the like.

As the flexible metal roll, a roll that is configured to flow or hold a heating medium (cooling medium) inside the soft foundation is preferable.

The outer cylinder may be the same as that mentioned for the rigid roll. Examples thereof include one in which the outer surface of a nickel alloy is chrome-plated.

A wall thickness of the flexible outer cylinder is preferably less than 1.0 mm, more preferably from 0.05 to 0.7 mm, and particularly preferably from 0.07 to 0.5 mm. In a case in which the wall thickness is the upper limit value of the range or less, flexibility may be secured, and in a case in which the wall thickness is the lower limit value or more, durability is excellent.

Examples of the soft foundation include a rubber (e.g., silicone), an elastomer, and a liquid. Examples of the rubber and the elastomer include those the same as described above. In a case in which the soft foundation consists of a liquid, a heating medium may be used as the liquid.

In a case in which the soft foundation is a rubber or an elastomer, a thickness of the soft foundation is preferably 0.5 mm or more, more preferably from 1 to 30 mm, and particularly preferably from 2 to 20 mm. In a case in which the thickness of soft foundation is the lower limit value of the range or more, when the melt 1 passes between the rigid roll and the elastic roll, the elastic roll is sufficiently deformed, and thus internal strain is less likely to occur. In a case in which the thickness of the soft foundation is the upper limit value of the range or less, temperature exchangeability with the heating medium is excellent.

The smaller the surface roughness (surface roughness of the coating in the coated roll or surface roughness of the flexible outer cylinder in the flexible metal roll) of the C0 roll 17, the more preferable, as with the surface roughness of C1 roll 15.

The surface roughness of the C0 roll 17 is controlled by either the arithmetic average roughness Ra or the maximum height Ry, as with the surface roughness of C1 roll 15.

Ra on the surface of the C0 roll 17 is preferably 0.8 µm or less, more preferably 0.5 µm or less, and particularly preferably 0.3 µm or less.

Ry on the surface of the C0 roll 17 is preferably 1 s or less and particularly preferably less than 0.3 s.

The C2 roll 19 moves along the C1 roll, and peels off the cooled melt 1, that is, the film, from the C1 roll 15 and transfers it to a winder (not shown).

The C2 roll 19 is not particularly limited, and for example, the above-described rigid roll, elastic roll, or the like may be used.

<Forming Method>

A method of forming a film using forming apparatus 10 will be described.

ETFE is supplied to extruder 11 and melt in the extruder 11. Other components may be preliminarily blended in ETFE to be supplied to the extruder 11, or other components may be supplied to the extruder 11 together with ETFE.

Next, the melt in the extruder 11 is continuously supplied to die 13 and extruded into a sheet. The extruded melt 1 is placed below the die 13 and allowed to pass between the C1 roll 15 and the C0 roll 17. The C1 roll 15 and the C0 roll 17 are pressed against each other with a predetermined linear pressure, and when the melt passes between them, the melt 1 is brought into close contact with the surface of the C1 roll 15 by the C0 roll 17. Further, the melt 1 is cooled from both sides by the C1 roll 15 and the C0 roll 17.

The melt 1 that has passed between the C1 roll 15 and the C0 roll 17 is further cooled while moving along the C1 roll 15 rotating at a predetermined speed. The cooled melt 1 (film) is peeled off from the C1 roll 15 by the C2 roll 19, further cooled as necessary, and transferred to a winder (not shown).

As ETFE, a commercially available product may be used, or a product manufactured by a known production method may be used. The method of producing ETFE is not particularly limited, and examples thereof include a polymerization method using a radical polymerization initiator. The polymerization method is not particularly limited, and examples thereof include bulk polymerization, solution polymerization, suspension polymerization, and emulsification polymerization.

The temperature inside the extruder 11 is equal to or higher than the melting point of ETFE in order to melt ETFE, which is preferably from (melting point+10° C.) to (melting point+150° C.), and particularly preferably from (melting point+20° C.) to (melting point+100° C.). In a case in which the temperature inside the extruder 11 is the lower limit value of the range or more, stable extrusion forming is possible because a homogeneous melt may be obtained, and in a case in which the temperature is the upper limit value of the range or less, deterioration of materials due to thermal decomposition may be suppressed.

The same applies to the preferred range of temperature inside the die 13.

An ejection port gap of the die 13 is set such that the thickness of the obtained film is from 250 to 400 μm.

The linear pressure between the C1 roll 15 and the C2 roll 17 is from 0.1 to 1,000 N/cm, preferably from 5 to 1,000 N/cm, more preferably from 10 to 500 N/cm, and particularly preferably from 30 to 300 N/cm. In a case in which the linear pressure is equal to or more than the lower limit value, the melt 1 adheres well to the C1 roll 15 and the occurrence of defects due to uneven pressing may be reduced. In a case in which the linear pressure is equal to or less than the upper limit value, when the melt 1 passes between the C1 roll 15 and the C0 roll 17, rotation, sideways flow and the like are less likely to occur inside the melt 1, and a film with reduced internal distortion is likely to be obtained. Further, the durability of the C0 roll 17, which is an elastic roll, is excellent.

An average of the heating medium temperature of C1 roll 15 and the heating medium temperature of C0 roll 17 (hereinafter also referred to as "average heating medium temperature") is from 40° C. to 180° C., preferably from 60° C. to 170° C., and particularly preferably 70° C. to 150° C. In a case in which the average heating medium temperature is the upper limit value of the range or less, the melt 1 is rapidly cooled when passing between the C1 roll 15 and the C0 roll 17, and therefore, the degree of crystallization of ETFE is reduced and the haze and UV reflectance of the obtained film are reduced. In a case in which the average heating medium temperature is the lower limit value of the range or more, the adhesion of the melt 1 to the roll is excellent.

The heating medium temperature of the C1 roll 15 is preferably from 40 to 180° C., and particularly preferably from 50 to 150° C. Further, the heating medium temperature of the C1 roll 15 may be from 40 to 120° C., from 40 to 100° C., from 50 to 100° C., or from 60 to 90° C. In a case in which the heating medium temperature of the C1 roll 15 is the lower limit value or more, the adhesion of the melt 1 to the C1 roll 15 is excellent. In a case in which the heating medium temperature is the upper limit value or less, the melt 1 is rapidly cooled when passing between the C1 roll 15 and the C0 roll 17, and therefore, the degree of crystallization of ETFE is reduced and the haze and UV reflectance of the obtained film are reduced.

The surface temperature of the C1 roll 15 upon forming is usually higher than the heating medium temperature and lower than the temperature of the melt 1.

A heating medium temperature of the C0 roll 17 may vary depending on the material of the surface of the C0 roll 17, but is preferably from 40° C. to 180° C., and particularly preferably from 50° C. to 150° C. Further, the heating medium temperature of the C0 roll 17 may be from 40° C. to 120° C., from 40° C. to 100° C., from 50° C. to 100° C., or from 60° C. to 90° C. In a case in which the heating medium temperature of the C0 roll 17 is the lower limit value or more, the operability is excellent without the need to use a special cooling method. In a case in which the heating medium temperature is the upper limit value or less, the melt 1 is rapidly cooled when passing between the C1 roll 15 and the C0 roll 17, and therefore, the degree of crystallization of ETFE is reduced, and the haze and UV reflectance of the obtained film are reduced, as well as longer elastic roll life.

The surface temperature of the C0 roll 17 upon forming is usually higher than the heating medium temperature and lower than the temperature of the melt 1.

A temperature of the melt 1 immediately before passing between the C1 roll 15 and the C0 roll 17 is from 200° C. to 330° C., preferably from 220° C. to 320° C., and particularly preferably from 240° C. to 310° C. In a case in which the temperature of the melt 1 is the lower limit value or more, the melt 1 is rapidly cooled when passing between the C1 roll 15 and the C0 roll 17, and therefore, the degree of crystallization of ETFE is reduced and the haze and UV reflectance of the obtained film are reduced. In a case in which the temperature of the melt 1 is the upper limit value or less, deterioration of materials due to thermal decomposition can be suppressed.

The temperature of the melt 1 immediately before passing between the C1 roll 15 and the C0 roll 17 may be adjusted based on the temperature inside the die 13, air gap, or the like. The air gap is the distance from the outlet of the die 13 to the cooling point. The cooling point is where the melt 1 extruded from the die first contacts the roll(s) (one or both of the two rolls).

The air gap is preferably 200 mm or less, and particularly preferably 150 mm or less.

A take-up speed (circumferential speed) of the C1 roll 15 is preferably from 0.3 to 50 m/min, and particularly preferably from 0.5 to 20 m/min. In a case in which the circumferential speed of the C1 roll 15 is the lower limit value or more, productivity of the film is excellent, and in a case in which the circumferential speed is the upper limit value or less, physical properties of the film are likely to be secured.

A heating medium temperature of the C2 roll 19 may be, for example, 100° C. or less or from 40° C. to 100° C.

The surface temperature of the C2 roll 19 upon forming is usually higher than the heating medium temperature and lower than the temperature of the film.

A ratio of the take-up speed (m/min) of the C2 roll 19 to the take-up speed (m/min) of the C1 roll 15 (hereinafter also referred to as "C2/C1 take-up speed ratio") is, for example, from 1.00 to 1.04, and preferably from 1.00 to 1.02. As the C2/C1 take-up speed ratio is greater than 1.00, the melt 1 is stretched, and therefore, the shrinkage rate tends to increase when heating is performed at 150° C. for 10 minutes. In a case in which the C2/C1 take-up speed ratio is within the preferred range, it is easy to bring the rate of dimensional change on heating within the preferred range.

(Forming Method 2)

In the forming method 2, a melt is obtained by melting ETFE, the melt is continuously extruded through a die to form the melt into a sheet shape, and one side of the sheet-shaped melt is brought into contact with the C1 roll to cool. A C2 roll is provided after the C1 roll as necessary, and the melt (film) that has moved along the C1 roll and cooled is peeled off from the C1 roll, and further cooled by the C2 roll. Accordingly, a film is obtained.

<Forming Apparatus>

FIG. 2 is a schematic view showing an embodiment of the forming apparatus used in the forming method 2.

The forming apparatus 20 includes: an extruder 11; a die 13 connected to the extruder 11; a C1 roll 15; a C2 roll 19; and a winder (not shown).

The forming apparatus 20 is the same as the forming apparatus 10 of FIG. 1 except that the C0 roll 17 is not provided.

<Forming Method>

A method of forming a film using forming apparatus 20 will be described. ETFE is supplied to extruder 11 and melt in the extruder 11. Other components may be preliminarily blended in ETFE to be supplied to the extruder 11, or other components may be supplied to the extruder 11 together with ETFE.

Next, the melt in the extruder 11 is continuously supplied to die 13 and extruded into a sheet. The extruded melt 1 is taken up by the C1 roll 15 placed below the die 13. At this time, the melt 1 is cooled from one side by the C1 roll 15.

The melt 1 taken up by the C1 roll 15 is further cooled while moving along the C1 roll 15 rotating at a predetermined speed. The cooled melt 1 (film) is peeled off from the C1 roll 15 by the C2 roll 19, further cooled as necessary, and transferred to a winder (not shown).

A heating medium temperature of the C1 roll 15 is, for example, from 100° C. to 250° C.

The surface temperature of the C1 roll 15 upon forming usually becomes higher than the heating medium temperature.

Conditions other than the surface temperature of the C1 roll 15 may be the same as in the forming method 1.

An average the heating medium temperature of C1 roll 15 and the heating medium temperature of C2 roll 19 is from 40° C. to 180° C., preferably from 60° C. to 170° C., and particularly preferably 70° C. to 150° C. In a case in which the average heating medium temperature is within the range, the melt 1 is cooled when passing the C1 roll 15 and then further cooled by the C2 roll 19 such that the degree of crystallization of ETFE is reduced and the haze and UV reflectance of the obtained film are reduced.

A UV absorber layer may be formed to the film formed by the forming method 1 or the forming method 2.

(Forming Methods 1 and 2)

As described above, in the approach (1) using ETFE having a low crystalline composition, the heating medium temperatures of the C1 roll 15 and the C0 roll 17 may be set relatively high, and therefore, the allowable range of the cooling rate is broadened. On the other hand, in the approach of (2) in which rapid cooling is performed, the allowable range for the composition of ETFE is broadened.

Therefore, when the average the heating medium temperature of the C1 roll 15 and the heating medium temperature of the C0 roll 17 or the average the heating medium temperature of the C1 roll 15 and the heating medium temperature of the C2 roll 19 in the case of not using the C0 roll 17 is designated as T (° C.) and the melting point of ETFE is designated as M (° C.), T×M, which is the product of T and M, is preferably 31,000 or less and more preferably 30,000 or less. Further, T×M is preferably 10,000 or more, more preferably 12,000 or more, still more preferably 13,000 or more, and particularly preferably 14,000 or more.

EXAMPLES

Hereinafter, the present invention will be described in more detail with reference to the following examples, but the present invention is not limited to these examples. Hereinafter, PFBE means $CH_2=CH(CF_2)_4F$. Examples 7 to 19 are Working Examples and Examples 1 to 6 and 20 are Comparative Examples.

Evaluation Method (Optical Properties)

The haze was measured using a turbidimeter NDH-5000 manufactured by NIPPON DENSHOKU INDUSTRIES CO., LTD. in accordance with JIS K7136:2000.

The UV reflectance and the visible light transmittance were measured using an ultraviolet-visible spectrophotometer UV-3600PC manufactured by SHIM ADZU CORPORATION in accordance with DIN EN 410:1998.

The optical properties of a film on which an UV absorber layer was formed were measured in the direction in which light was incident from the side (ETFE surface) opposite to the side on which the UV absorber layer was formed.

As a reference, the optical properties of commercially available float glass (thickness: 2.8 mm; manufactured by AGC; trade name: FL3) and Low-E pair glass (thickness: 24 mm; manufactured by AGC Inc.; trade name: SUNBALANCE Pure Clear (SBP6+A12+FL6)) were measured by the measuring method described above. The results are shown as follows.

Float glass: haze 0.8%; UV reflectance: 7.4%; Visible light transmittance: 91.7%.

Low-E pair glass: haze: 1.2%; UV reflectance: 18.2%; Visible light transmittance: 77.2%.

(Rate of Dimensional Change on Heating)

The rate of dimensional change on heating was determined in accordance with JIS K7133:1999 "Plastics-Film and sheeting-Determination of dimensional change on heating." The heating conditions were 150° C. for 10 minutes, and was measured in the MD and TD.

(Stress at 10% Extension)

Stress at 10% extension means stress at 10% extension at 80° C. and was measured in accordance with JIS K7127:

1999 "Plastics-Determination of tensile properties-Part 3: Test conditions for films and sheets." The sample shape was Type 5 of dumbbell type, the tensile speed was 200 mm/min, and it was measured in the MD and TD of the film. The measurement temperature was 80° C.

(Melting Point)

The melting point was measured using a scanning differential thermal analyzer (model DSC7030 manufactured by Seiko Instruments Inc.).

(Film Thickness)

The film thickness was measured using a digital micrometer (model M-30 manufactured by Precision Technology Inc.).

(Designability through Film)

The film was placed perpendicular to the ground. Separately, drawing paper on which a black circle having a radius of 10 cm was drawn was placed vertically on the ground at a point 20 cm away from the film in the direction perpendicular to the film surface. Then, the drawing paper was observed through the film from a point 1 m away from the film in the direction opposite to the drawing paper, and the visibility of the black circle was evaluated. Visibility was judged by the following two indexes: (1) whether or not the outline of the black circle is clearly visible; and (2) whether or not the outline looks black or gray. When the outline of the circle is clearly visible and can be determined to be black, it is evaluated as A, when the outline is clearly visible but looks gray, it is evaluated as B, and when the results do not apply to either A or B, it is evaluated as C. Only A may be used.

(Inconspicuousness of Scratches)

A rotary ablation tester (manufactured by Toyo Seiki Seisaku-sho, Ltd.) was used for scratching the surface of the film with an abrasive wheel. As the abrasive wheel, CS10 was used and rotated 100 times at 4.9 N. Then, the film was visually observed from a distance of 1 m or 3 m, and it was evaluated whether or not scratches were visible. A film in which scratches could be confirmed from a point 3 m away was evaluated as C, a film in which scratches could be confirmed from a point 1 m away but not from a point 3 m away was evaluated as B, and a film in which scratches could not be confirmed even from a point 1 m away was evaluated as A. B and A may be used.

(Deflection after Leaving at 60° C.)

Two square aluminum frames each having a side of 50 cm were prepared. Double-sided adhesive tape was attached to both frames, and butyl rubber having a thickness of 1 mm was fixed thereon. Then, double-sided adhesive tape was attached on the butyl rubber of one frame, and a film was placed thereon. Further, the other frame was placed thereon such that the butyl rubber of the other frame was in contact with the film side, and the four corners were tightened. In this way, a test body in which the film was sandwiched between frames was produced. At this time, care was taken such that the film did not bend due to its own weight.

The test body was then placed in a high temperature bath at 60° C. for 5 minutes and then left at 25° C. for 1 day. Thereafter, the magnitude of the tension remaining on the film was determined from the strength of the repulsive force of the film when the film was pressed with a finger. When the film was dented more than 5 mm, it was evaluated as C, when the film was dented more than 0 mm and 5 mm or less, it was evaluated as B, and when the film was not dented at all, it was evaluated as A. The smaller the amount of denting, the greater the tension remaining on the film and the less likely the film bends, which is preferable. A force of 10 N was applied to a film having a thickness of 250 μm, and a force of 15 N was applied to a film having a thickness of 400 μp by the fingertip. A and B may be used.

ETFE Production Examples

Production Example 1

A stainless steel polymerization tank provided with a jacket having a volume of 430 L was degassed and charged with 438 kg of 1-hydrotridecafluorohexane, 3.35 kg of methanol, and 2.28 kg of (perfluorobutyl)ethylene (PFBE). Tetrafluoroethylene (TFE) and ethylene (E) were introduced under pressure up to 1.5 MPa (gauge pressure) at a ratio of 84/16 (molar ratio). The temperature inside the polymerization tank was raised to 66° C., and 1.73 L of a 1-hydrotridecafluorohexane solution including 2% by mass of tert-butyl peroxypivalate was charged as a radical polymerization initiator, thereby initiating polymerization. A mixed gas of TFE/E=54/46 (molar ratio) was continuously charged during the polymerization such that the pressure was maintained constant, and PFBE was continuously charged so as to result in 1.4 mol % with respect to this mixed gas. After 197 minutes from the initiation of polymerization, when 34.7 kg of the mixed gas was charged, the temperature inside the polymerization tank was lowered to 25° C. and purged to normal pressure. The obtained slurry was transferred to an 850-L granulation tank, 340 L of water was added, and the solvent was removed while heating, thereby obtaining 37 kg of ETFE1. The composition of ETFE1 was TFE unit/E unit/PFBE unit=54/46/1.4 (molar ratio), the melting point was 262° C., and the Q value was 5.4 mm$^3$/sec.

Production Example 2

ETFE2 in an amount of 36 kg was obtained in the same manner as in Production Example 1 except that the charged amount of 1-hydrotridecafluorohexane was 436 kg, the charged amount of methanol was 2.92 kg, and the charged amount of PFBE was 2.77 kg before the temperature was raised in the polymerization tank; the charged amount of the 1-hydrotridecafluorohexane s olution including 2% by mass of tert-butyl peroxypivalate was 2.10 L and the charged amount of PFBE was 1.7 mol % with respect to the mixed gas after the temperature rise; and after 185 minutes from the initiation of polymerization, the temperature inside the polymerization tank was lowered when 34.2 kg of the mixed gas was charged. The composition of ETFE2 was TFE unit/E unit/PFBE unit=54/46/1.7 (molar ratio), the melting point was 258° C., and the Q value was 5.4 mm$^3$/sec.

Production Example 3

ETFE3 in an amount of 36.5 kg was obtained in the same manner as in Production Example 1 except that the charged amount of 1-hydrotridecafluorohexane was 436 kg, the charged amount of methanol was 2.9 kg, the charged amount of PFBE was 4.89 kg, and the molar ratio of TFE/E was 75/25 before the temperature was raised in the polymerization tank; the charged amount of the 1-hydrotridecafluorohexane solution including 2% by mass of tert-butyl peroxypivalate was 3.80 L, the molar ratio of TFE/E of the mixed gas was 51/49, and the charged amount of PFBE was 3.0 mol % with respect to the mixed gas after the temperature rise; and after 189 minutes from the initiation of polymerization, the temperature inside the polymerization tank was lowered when 34.7 kg of the mixed gas was charged. The composition of ETFE3 was TFE unit/E unit/PFBE-derived unit=51/49/3.0 (molar ratio), the melting point was 246° C., and the Q value was 5.4 mm³/sec.

Production Example 4

ETFE4 in an amount of 35.9 kg was obtained in the same manner as in Production Example 1 except that the charged amount of 1-hydrotridecafluorohexane was 436 kg, the charged amount of methanol was 1.8 kg, and the charged amount of PFBE was 5.3 kg before the temperature was raised in the polymerization tank; the charged amount of the 1-hydrotridecafluorohexane solution including 2% by mass of tert-butyl peroxypivalate was 5.70 L and the charged amount of PFBE was 3.0 mol % with respect to the mixed gas after the temperature rise; and after 190 minutes from the initiation of polymerization, the temperature inside the polymerization tank was lowered when 35.7 kg of the mixed gas was charged. The composition of ETFE4 was TFE unit/E unit/PFBE unit=54/46/3.0 (molar ratio), the melting point was 244° C., and the Q value was 6.4 mm³/sec.

Production Example 5

ETFE5 in an amount of 36.2 kg was obtained in the same manner as in Production Example 1 except that the charged amount of 1-hydrotridecafluorohexane was 436 kg, the charged amount of methanol was 1.32 kg, the charged amount of PFBE was 5.0 kg, and the molar ratio of TFE/E was 89/11 before the temperature was raised in the polymerization tank; the charged amount of the 1-hydrotridecafluorohexane solution including 2% by mass of tert-butyl peroxypivalate was 5.34 L, the molar ratio of TFE/E of the mixed gas was 60/40, and the charged amount of PFBE was 3.0 mol % with respect to the mixed gas after the temperature rise; and after 190 minutes from the initiation of polymerization, the temperature inside the polymerization tank was lowered when 36.2 kg of the mixed gas was charged. The composition of ETFE5 was TFE unit/E unit/PFBE unit=60/40/3.3 (molar ratio), the melting point was 226° C., and the Q value was 12.4 mm³/sec.

Production Example 6

ETFE6 in an amount of 35.9 kg was obtained in the same manner as in Production Example 1 except that the charged amount of 1-hydrotridecafluorohexane was 436 kg, the charged amount of methanol was 0.8 kg, the charged amount of PFBE was 8.5 kg, and the molar ratio of TFE/E was 89/11 before the temperature was raised in the polymerization tank; the charged amount of the 1-hydrotridecafluorohexane solution including 2% by mass of tert-butyl peroxypivalate was 9.86 L, the molar ratio of TFE/E of the mixed gas was 60/40, and the charged amount of PFBE was 5.0 mol % with respect to the mixed gas after the temperature rise; and after 197 minutes from the initiation of polymerization, the temperature inside the polymerization tank was lowered when 36.0 kg of the mixed gas was charged. The composition of ETFE6 was TFE unit/E unit/PFBE unit=60/40/5.0 (molar ratio), the melting point was 210° C., and the Q value was 16.4 mm³/sec.

Production Example 7

ETFE7 in an amount of 36.1 kg was obtained in the same manner as in Production Example 1 except that the charged amount of 1-hydrotridecafluorohexane was 439 kg, the charged amount of methanol was 0.59 kg, and the charged amount of PFBE was 13.6 kg before the temperature was raised in the polymerization tank; the charged amount of the 1-hydrotridecafluorohexane solution including 2% by mass of tert-butyl peroxypivalate was 15.8 L and the charged amount of PFBE was 8.0 mol % with respect to the mixed gas after the temperature rise; and after 191 minutes from the initiation of polymerization, the temperature inside the polymerization tank was lowered when 36.3 kg of the mixed gas was charged. The composition of ETFE7 was TFE unit/E unit/PFBE unit=54/46/8.0 (molar ratio), the melting point was 191° C., and the Q value was 22.0 mm³/sec.

Working Examples and Comparative Examples

Example 1

NOWOFLON ET 6235Z 250 (manufactured by NOWOFOL; thickness: 250 μm), which is a transparent ETFE film for membrane structure, was used as the film of Example 1.

Example 2

Fluon ETFE FILM 250NJ (manufactured by AGC Inc.; thickness: 250 μm), which is a transparent ETFE film for membrane structure, was used as the film of Example 2.

Example 3

Fluon ETFE FILM 250HJ (manufactured by AGC Inc.; thickness: 260 μm), which is a milky-white ETFE film for membrane structure, which has a milky-white super matte side, was used as the film of Example 3.

Example 4

ETFE1 obtained in Production Example 1 was kneaded at a temperature of 280° C. at a screw rotation speed of 75 rpm and an extrusion output of 30 kg/hour using a co-rotating twin screw extruder (manufactured by TECHNOVEL CORPORATION) including a segment-type screw having an outer diameter of 32 mm and a length of 1,445 mm, strands having an outer diameter of 2.5±0.5 mm were extruded, and cooled with water, and then cut to a length of from 2 to 3 mm using a pelletizer, thereby forming pellets. Here, "rpm" refers to the number of revolutions per minute.

The pellets of ETFE1 were formed into a film by the forming method 2 without using a C0 roll shown in FIG. 2. The specific forming procedures are shown below.

A film-forming die having a width of 700 mm and an ejection port gap of 0.5 mm was attached to the tip of a single-screw extruder including a screw having an outer diameter of 65 mm and a length of 1,950 mm, a vacuum hopper (manufactured by MATSUBO Corporation) was attached to the material input port, and the inside of the vacuum hopper was maintained below 0.05 MPa. The pellets of ETFE1 were put into the material input port, and the temperatures of the extruder tip and the film-forming die were set to 330° C. ETFE1 was extruded from the film-forming die at an extrusion output of 37 kg/hour, cooled along the C1 roll placed directly below the film-forming die, further taken up by the C2 roll, and cooled to 25° C., thereby forming a film. As the C1 roll, a metal roll having the surface treated by hard chrome plating (Ry:0.2s) was used, the heating medium temperature was set to 150° C., and the take-up speed was set to 5 m/min. As the C2 roll, a metal roll treated by hard chrome plating (Ry:0.2s) was also used, the heating medium temperature was set to 90° C., and the take-up speed was set to 5 m/min (the take-up speed ratio of C2/C1 was 1).

Example 5

Silica-coated cerium oxide hydrophobized (silica-coated cerium oxide particles surface-hydrophobized with methyl hydrogen polysiloxane, manufactured by DAITO KASEI KOGYO CO., LTD.; trade name: SI01-5 CERIGUARD SC6832) as a UV absorber in an amount of 100 g was mixed with 1900 g of ETFE 1. The obtained mixture was kneaded using a co-rotating twin screw extruder at a cylinder temperature of 310° C. and a head temperature of 320° C., strands having an outer diameter of 2.5±0.5 mm were extruded and cooled with water, and then cut to a length of from 2 to 3 mm using a pelletizer, thereby forming masterbatch pellets containing a UV absorber (UV absorber content: 5% by weight based on the total masterbatch mass).

The masterbatch pellets and the pellets of ETFE1 produced in the same manner as in Example 1 were mixed in a ratio of masterbatch:ETFE1=1:9 (mass ratio).

A film (UV absorber content: 0.5% by mass based on the total film mass) was formed in the same manner as in Example 4 except that the obtained mixture was used instead of the pellets of ETFE1.

Example 6

Toluene and a hydroxyphenyltriazine-based UV absorber (TINUVIN 479 manufactured by BASF Japan Ltd.) as a UV absorber were added to a xylene solution of a fluorine-containing polymer having a hydroxyl group (manufactured by AGC Inc.; trade name: LF200; hydroxyl value: 31 mg (KOH)/g; solid content of fluorine-containing polymer: 60% by mass; glass transition temperature of fluorine-containing polymer: 25° C.), thereby preparing a coating liquid having a solid content of 35% by mass. The amount of the UV absorber added was 13 parts by mass with respect to 100 parts by mass of the fluorine-containing polymer. The amount of toluene added was set such that the viscosity of No. 3 Zahn cup was 25 seconds because gravure printing was performed on the gravure plate.

Subsequently, after corona discharge treatment was performed on one surface of the film formed in Example 4, the coating liquid was applied to the corona-treated surface with a gravure roll such that the thickness after drying was 2 μm, and dried at 100° C. for 10 seconds, thereby forming a UV absorber layer. Accordingly, a film having a UV absorber layer was obtained.

Example 7

ETFE1 was pelletized by the same method as in Example 4, and formed into a film by the forming method 1 (the method using the C0 roll) shown in FIG. 1. The specific forming procedures are the same as in Example 4 except for the roll configuration and the heating medium temperature. The same C1 roll as in Example 4 was used, and the heating medium temperature was set to 90° C. A silicone rubber roll (MW mirror roll manufactured by Mochida Corporation) was used as the C0 roll, and the heating medium temperature of the C0 roll was also set to 90° C. The air gap was set to 100 mm. The temperature of the melt 1 immediately before passing between the C1 roll and the C0 roll was 280° C. The nip pressure between the C1 roll and the C0 roll was 140 N/cm in linear pressure.

Example 8

A mixture of the masterbatch pellets and the pellets of ETFE1 was obtained in the same manner as in Example 5. A film (UV absorber content: 0.5% by mass based on the total film mass) was formed in the same manner as in Example 7 except that the obtained mixture was used instead of the pellets of ETFE1.

Example 9

A corona discharge treatment was performed on one surface of the film formed in Example 7 in the same manner as in Example 4, thereby forming a UV absorber layer. Accordingly, a film having a UV absorber layer was obtained.

Examples 10 to 13, 15 to 19

A film was formed in the same manner as in Example 7 except that ETFE shown in Table 1 was used instead of ETFE1, and the forming conditions (heating medium temperatures of the respective rolls, take-up speed ratio of C2/C1) and the thickness of film to be formed were set as shown in Table 1. In the cases of Examples 13, 18, and 19 for forming a film having a thickness of 400 μm, the ejection port gap of the film-forming die was set to 0.8 mm. In Examples 17, 18, and 19, since the melting point of resin was low, the temperature of the extruder for pelletization was set to 260° C. (280° C. in Example 4), and the temperatures of the extruder tip and the film-forming die were set to 300° C. (330° C. in Example 4). The temperature of the melt immediately before passing between the C1 roll and the C0 roll was 300° C. in Example 13, 260° C. in Example 17, and 280° C. in Examples 18 and 19.

Example 14

A film was formed in the same manner as in Example 4 except that ETFE4 was used instead of ETFE1.

Example 20

A film was formed in the same manner as in Example 4 except that ETFE7 was used instead of ETFE1 and the forming conditions (heating medium temperatures of the respective rolls) were set as shown in Table 1. Since the melting point of resin was low in Example 20, the temperature of the extruder for pelletization was set to 260° C. (280° C. in Example 4), and the temperatures of the extruder tip and the film-forming die were set to 290° C. (330° C. in Example 4). The temperature of the melt immediately before passing between the C1 roll and the C0 roll was 270° C.

Table 1 shows the composition (TFE/E, PFBE) and the melting point of ETFE used in each example. In Table 1, "TFE/E" in the composition of ETFE indicates the molar ratio of the TFE unit to the E unit, and "PFBE" indicates the ratio (mol) of PFBE with respect to a total of 100 mols of the TFE unit and the E unit.

Table 2 shows the optical properties, rate of dimensional change on heating, and stress at 10% extension at 80° C. of the film of each example. Table 2 also shows the evaluation results of designability through the film, inconspicuousness of scratches, and deflection after leaving at 60° C.

TABLE 1

| | Forming Material | | | | Forming Condition | | | | | | | |
|---|---|---|---|---|---|---|---|---|---|---|---|---|
| | ETFE | | | | Heating Medium Temperature (° C.) | | | Average Heating Medium Temperature | | C2/C1 Speed Ratio of Take-up | UV Absorber Coating | Film Thickness (μm) |
| | Kind | Composition TFE/E | PFBE | Melting Pint M (° C.) | Kneading of UV Absorber | C1 Roll | C0 Roll | C2 Roll | T (° C.) | M × T | | | |
| Example 1 | | | | | Commercially available film | | | | | | | | 250 |
| Example 2 | | | | | Commercially available film | | | | | | | | 250 |
| Example 3 | | | | | Commercially available film | | | | | | | | 260 |
| Example 4 | ETFE1 | 54/46 | 1.4 | 262 | — | 150 | None | 90 | 120 | 31,440 | 1 | — | 250 |
| Example 5 | ETFE1 | 54/46 | 1.4 | 262 | Done | 150 | None | 90 | 120 | 31,440 | 1 | — | 250 |
| Example 6 | ETFE1 | 54/46 | 1.4 | 262 | — | 150 | None | 90 | 120 | 31,440 | 1 | Done | 252 |
| Example 7 | ETFE1 | 54/46 | 1.4 | 262 | — | 90 | 90 | 70 | 90 | 23,580, | 1 | — | 250 |
| Example 8 | ETFE1 | 54/46 | 1.4 | 262 | Done | 90 | 90 | 70 | 90 | 23,580, | 1 | — | 250 |
| Example 9 | ETFE1 | 54/46 | 1.4 | 262 | — | 90 | 90 | 70 | 90 | 23,580, | 1 | Done | 250 |
| Example 10 | ETFE2 | 54/46 | 1.7 | 258 | — | 90 | 90 | 70 | 90 | 23,220 | 1 | — | 250 |
| Example 11 | ETFE2 | 54/46 | 1.7 | 258 | — | 80 | 80 | 60 | 80 | 20,640 | 1 | — | 250 |
| Example 12 | ETFE3 | 51/49 | 3.0 | 246 | — | 90 | 90 | 70 | 90 | 22,140 | 1 | — | 250 |
| Example 13 | ETFE3 | 51/49 | 3.0 | 246 | — | 60 | 60 | 50 | 60 | 14,760 | 1 | — | 400 |
| Example 14 | ETFE4 | 54/46 | 3.0 | 244 | — | 150 | None | 90 | 120 | 29,280 | 1 | — | 250 |
| Example 15 | ETFE4 | 54/46 | 3.0 | 244 | — | 90 | 90 | 70 | 90 | 21,960 | 1 | — | 250 |
| Example 16 | ETFE4 | 54/46 | 3.0 | 244 | — | 90 | 90 | 70 | 90 | 21,960 | 1.02 | — | 250 |
| Example 17 | ETFE5 | 60/40 | 3.3 | 226 | — | 90 | 90 | 70 | 90 | 20,340 | 1 | — | 250 |
| Example 18 | ETFE5 | 60/40 | 3.3 | 226 | — | 70 | 70 | 50 | 70 | 15,820 | 1 | — | 400 |
| Example 19 | ETFE6 | 60/40 | 5.0 | 210 | — | 70 | 70 | 50 | 70 | 14,700 | 1 | — | 400 |
| Example 20 | ETFE7 | 54/46 | 8.0 | 191 | — | 120 | None | 70 | 95 | 18,145 | 1 | — | 250 |

"Average Heating Medium Temperature T (° C.)" in Table 1 indicates the average the heating medium temperature of the C1 roll 15 and the heating medium temperature of the C0 roll 17 or the average the heating medium temperature of the C1 roll 15 and the heating medium temperature of the C2 roll 19 in the case of not using the C0 roll 17.

TABLE 2

| | Optical Properties (%) | | | Rate of Dimensional Change on Heating (%) | | Stress at 10% Extension (MPa) | | Designability through Film | Inconspicuousness of Scratches | Deflection after Leaving at 60° C. |
|---|---|---|---|---|---|---|---|---|---|---|
| | Haze | UV Reflectance | Visible Light Transmittance | MD | TD | MD | TD | | | |
| Example 1 | 11.6 | 20.1 | 88.6 | −1.0 | −1.5 | 9.9 | 9.7 | B | A | B |
| Example 2 | 9.8 | 17.7 | 91.5 | −1.3 | −1.5 | 9.4 | 9.4 | B | A | B |
| Example 3 | 75.0 | 17.1 | 92.2 | −2.2 | −2.2 | 9.1 | 9.2 | C | A | A |
| Example 4 | 10.0 | 17.2 | 90.5 | −1.0 | 0.0 | 9.2 | 9.2 | B | A | C |
| Example 5 | 12.9 | 6.4 | 87.8 | −0.8 | −0.5 | 9.2 | 9.1 | B | A | B |
| Example 6 | 11.4 | 7.8 | 90.0 | −1.1 | −1.2 | 9.2 | 9.3 | B | A | B |
| Example 7 | 6.6 | 14.4 | 93.0 | −2.1 | −2.4 | 9.2 | 9.3 | A | B | A |
| Example 8 | 7.0 | 6.0 | 89.2 | −2.2 | −2.5 | 9.3 | 9.3 | A | B | A |
| Example 9 | 7.5 | 7.1 | 91.0 | −1.5 | −2.0 | 9.2 | 9.2 | A | B | A |
| Example 10 | 6.9 | 13.4 | 93.2 | −2.2 | −2.0 | 9.3 | 9.3 | A | B | A |
| Example 11 | 5.9 | 14.4 | 92.8 | −2.3 | −2.5 | 9.3 | 9.2 | A | B | A |
| Example 12 | 3.0 | 11.5 | 93.4 | −2.5 | −2.5 | 7.8 | 7.9 | A | B | A |
| Example 13 | 6.6 | 12.9 | 91.2 | −1.8 | −1.8 | 7.8 | 2.8 | A | B | A |
| Example 14 | 7.0 | 15.5 | 91.4 | −1.0 | −1.5 | 7.3 | 7.3 | A | B | B |
| Example 15 | 4.0 | 12.5 | 93.4 | −1.9 | −2.0 | 7.4 | 7.4 | A | B | A |
| Example 16 | 4.0 | 12.5 | 93.4 | −2.5 | −2.6 | 7.5 | 7.5 | A | B | A |
| Example 17 | 1.5 | 8.0 | 94.8 | −1.6 | −1.8 | 4.7 | 4.7 | A | B | A |
| Example 18 | 5.1 | 14.0 | 92.6 | −2.6 | −2.0 | 4.6 | 4.7 | A | B | A |
| Example 19 | 3.2 | 12.0 | 93.0 | −2.5 | −3.0 | 3.5 | 3.6 | A | B | A |
| Example 20 | 0.8 | 8.1 | 95.9 | −2.9 | −2.6 | 2.2 | 2.4 | A | C | A |

Since the films of Examples 7 to 19 had a haze of from 1.2% to 8.0%, they were excellent in designability through the film, and scratches were inconspicuous. Further, they had a UV reflectance of less than 17.0%, which were eye-friendly.

Meanwhile, the films of Examples 1 to 3, which were commercially available membrane structure ETFE films, had a haze of more than 8.0%, and thus were inferior in designability through the film. In addition, their UV reflectance was more than 17.0%.

The films of Examples 4 to 6 had a haze of more than 8.0%, and thus were inferior in designability through the film. In particular, the film of Example 4 had a UV reflectance of more than 17.0%.

The film of Example 20 had a haze of less than 1.2%, and thus scratches were conspicuous.

INDUSTRIAL APPLICABILITY

The film in the present invention is excellent in designability through the film, is inconspicuous even when scratched, and is eye-friendly.

The method of producing a film can provide a film which has excellent designability through the film, is inconspicuous even when scratched and is eye-friendly.

The entire contents of the disclosures by Japanese Patent Application No. 2020-076243 are incorporated herein by reference.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCES

1: Melt, 10: Forming apparatus, 11: Extruder, 13: Die, 15: Roll (C1 roll), 17: Roll (C0 roll), 19: Roll (C2 roll), 20: Forming apparatus

The invention claimed is:

1. A method of producing a film comprising a copolymer having a tetrafluoroethylene-based unit and an ethylene-based unit, comprising:
    melting a copolymer comprising a copolymer having a tetrafluoroethylene-based unit and an ethylene-based unit such that a melt comprising the copolymer is obtained;
    continuously extruding the melt through a die to form the melt into a sheet shape; and
    passing the melt extruded in the sheet shape between a pair of a rigid roll and an elastic roll or bringing the melt extruded in the sheet shape into contact with a rigid roll or an elastic roll, and a subsequent stage roll placed at a subsequent stage, for cooling such that a film comprising the copolymer is obtained,
    wherein the film has a haze in a range of 1.2% to 8.0%, an ultraviolet reflectance of less than 17.0%, and a thickness in a range of 250 to 400 μm, a surface temperature of each of the rigid roll, the elastic roll and the subsequent stage roll is controlled with a heating medium, a temperature of the melt immediately before passing between the rigid roll and the elastic roll or immediately before being in contact with the rigid roll or the elastic roll is in a range of from 200° C. to 330° C., a melting point M of the copolymer is 200° C. or more, and an average of a heating medium temperature of the rigid roll and a heating medium temperature of the elastic roll or an average of a heating medium temperature of the rigid roll or the elastic roll and a heating medium temperature of the subsequent stage roll is designated as T (° C.), T×M is 31,000 or less.

2. The method of claim 1, wherein the film has a thickness in a range of 250 to 300 μm.

3. The method of claim 1, wherein the film has a rate of dimensional change in each of a machine direction, MD, and a transverse direction, TD, of respectively in a range of −3.5% to −1.0% when heating is carried out at 150° C. for 10 minutes and then cooling is carried out to 23° C., based on dimensions of the film at 23° C., and the film has a stress at 10% extension in each of MD and TD at 80° C. of respectively 3.0 MPa or more.

4. The method of claim 1, wherein a content of the copolymer is 90% by mass or more with respect to a total mass of the film.

5. The method of claim 1, wherein the copolymer has another unit based on a different monomer other than tetrafluoroethylene and ethylene, and a total content of the other unit is in a range of 1 to 7 mol % with respect to a total of the tetrafluoroethylene-based unit and the ethylene-based unit.

6. The method of claim 1, wherein the film is a membrane structure film.

7. The method of claim 1, wherein the average of the heating medium temperature of the rigid roll or the elastic roll and the heating medium temperature of the subsequent stage roll is designated as T (° C.), T×M is 31,000 or less.

8. The method of claim 1, wherein the film is a single-layer film.

* * * * *